United States Patent [19]
Sheng

[11] Patent Number: 5,831,696
[45] Date of Patent: Nov. 3, 1998

[54] BASE STRUCTURE FOR LIQUID CRYSTAL DISPLAY

[75] Inventor: Chia-Ming Sheng, Keelung, Taiwan

[73] Assignee: Compal Electronics, Inc., Taipei, Taiwan

[21] Appl. No.: 882,437

[22] Filed: Jun. 25, 1997

[51] Int. Cl.[6] .............................. G02F 1/1333; H05K 5/00
[52] U.S. Cl. .............................. 349/58; 349/60; 361/681; 248/917
[58] Field of Search ........................................ 349/58, 60

[56] References Cited

U.S. PATENT DOCUMENTS

| | | | |
|---|---|---|---|
| 4,809,078 | 2/1989 | Yabe et al. | 349/58 |
| 4,958,911 | 9/1990 | Beiswenger et al. | 349/58 |
| 5,240,427 | 8/1993 | Kobayashi | 439/165 |
| 5,594,574 | 1/1997 | Lara et al. | 349/58 |
| 5,666,172 | 9/1997 | Ida et al. | 349/58 |
| 5,768,095 | 6/1998 | Nakamura et al. | 361/681 |

FOREIGN PATENT DOCUMENTS

| | | |
|---|---|---|
| 8054962 | 2/1996 | Japan . |
| 8263169 | 10/1996 | Japan . |
| 9270717 | 10/1997 | Japan . |
| 9326569 | 12/1997 | Japan . |

Primary Examiner—William L. Sikes
Assistant Examiner—Tarifur R. Chowdhury
Attorney, Agent, or Firm—Pro-Techtor International Services

[57] ABSTRACT

A base structure for liquid crystal display, including a base seat and a support pivotally disposed on the base seat. The display is fixed on the support. The support includes a first unit and a third unit freely pivotally connected with the base seat and a second unit connected between the first and third units. The second unit is relatively movable on the first unit in accordance with the movement of the support. The first unit is formed with a window. A fixing/adjusting device is mounted on the second unit and movable along with the second unit to the window of the first unit to be restricted within the window, whereby the display is adjusted and fixed within the range of the window by different observation angles.

4 Claims, 3 Drawing Sheets

BASE STRUCTURE FOR LIQUID CRYSTAL DISPLAY

BACKGROUND OF THE INVENTION

The present invention relates to a base structure for liquid crystal display.

Conventionally, the base for liquid crystal display is pivotally connected with a support which is pivotally connected with the display. A button or resilient member is disposed between the support and the base seat to provide a fastening effect for the pivot shaft so as to locate the support by different angles.

The pivot shaft is normally under a fastened state so that it is necessary to exert a great force for rotating the support when changing the angle of the display. After a period of use, the pivot shaft is subject to abrasion. This leads to insufficient fastening force and loosening of the display. In addition, in the case of a larger display, the pivot shaft will suffer a greater weight and may be unable to stably support the display.

Some other conventional fastening strucutures may be able to more reliably support the display. However, such structure is quite complicated and includes many components. Therefore, the manufacturing cost is high.

SUMMARY OF THE INVENTION

It is a primary object of the present invention to provide a base structure which is simple, while able to provide reliable adjusting and locating effect for the support. The base structure minimizes the abrasion of the pivot shaft and solves the problem of insufficient supporting force and loosening of the display.

According to the above object, the base structure of the present invention includes a base seat and a support pivotally disposed on the base seat. The display is fixed on the support. The support includes a first unit and a third unit freely pivotably connected with the base seat and a second unit connected between the first and third units. The second unit is relatively movable on the first unit in accordance with the movement of the support. The first unit is formed with a window. A fixing/adjusting device is mounted on the second unit and movable along with the second unit to the window of the first unit to be restricted within the window, whereby the display is adjusted and fixed within the range of the window by different observation angles. When packed, the respective units of the support can be folded into an overlying state parallel to the base seat so as to reduce the occupied room during transferring.

The present invention can be best understood through the following description and accompanying drawings, wherein:

DETAILED DESCRIPTION OF THE PREFERRED EMBODIMENT

Figure 1:
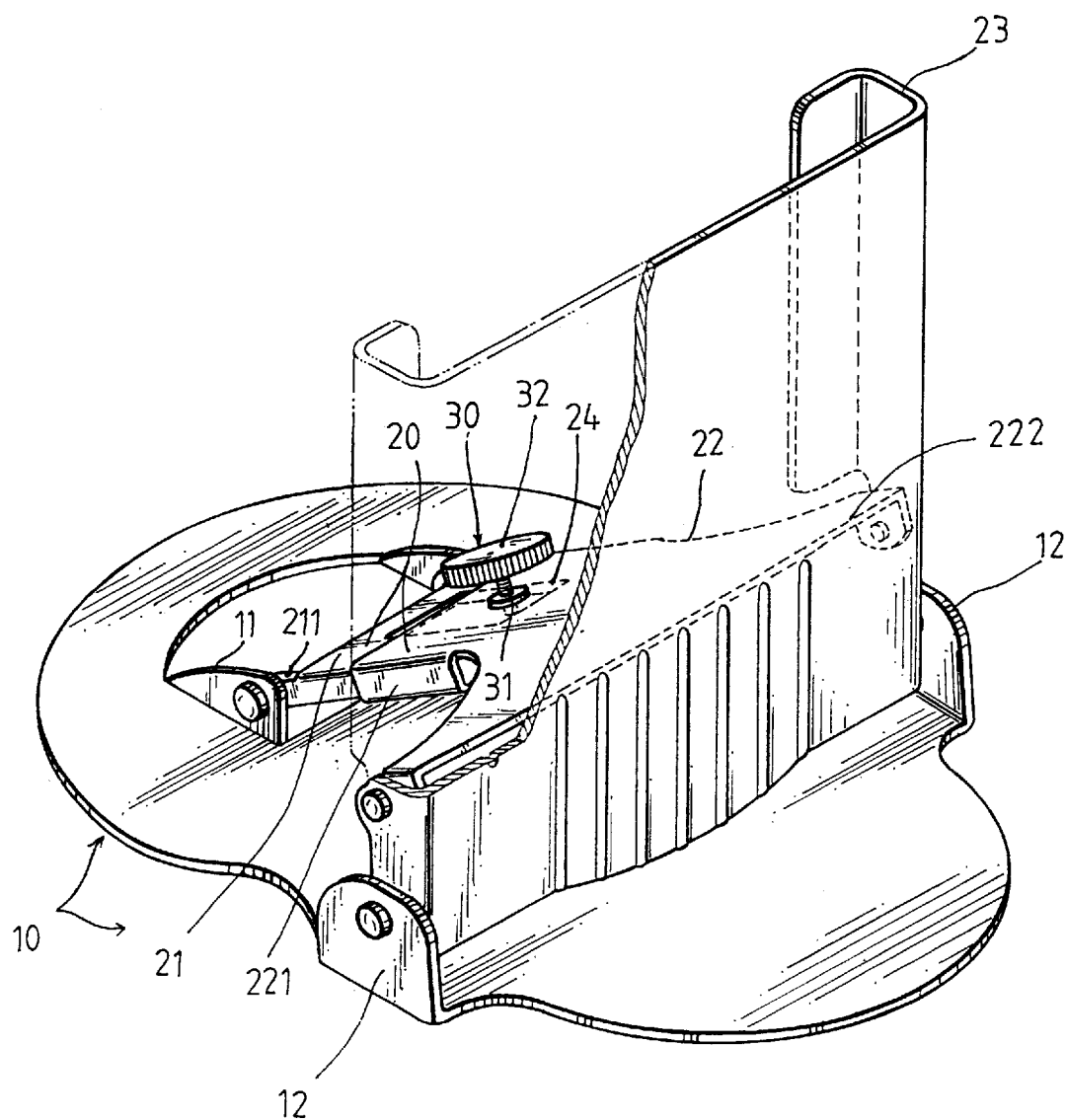
FIG. 1 is a perspective view of the present invention, showing the structure thereof.

Please refer to FIG. 1. The present invention includes a base seat 10 and a support 20. The base seat 10 is disposed with at least two connecting sections 11, 12 for pivotally connecting with the support 20. The support 20 includes a first unit 21, a second unit 21 movable relative to the first unit 21 and a third unit 23 for fixing the display 40.

The first and third units 21, 23 are respectively disposed with end sections 211, 231 respectively pivotally connecting with the connecting sections 11, 12 of the base seat.

One end section 221 of the second unit 22 is formed with a U-shaped channel for fitting with the first unit 21. The other end section 222 of the second unit is pivotally connected with the third unit 23, whereby the first, second and third units 21, 22, 23 can be freely rotated on the base seat 10 and the first and second units 21, 22 can be slided relative to each other in relation to the rotational angle thereof.

Referring again to FIG. 1, the first unit 21 is further formed with a window 24, whereby when the second unit 22 moves to the window 24, a fixing/adjusting device 30 mounted on the second unit 22 is restricted within the window. Accordingly, the inclination angle of the display 40 is adjusted and fixed within the range of the window 24.

Figure 2:
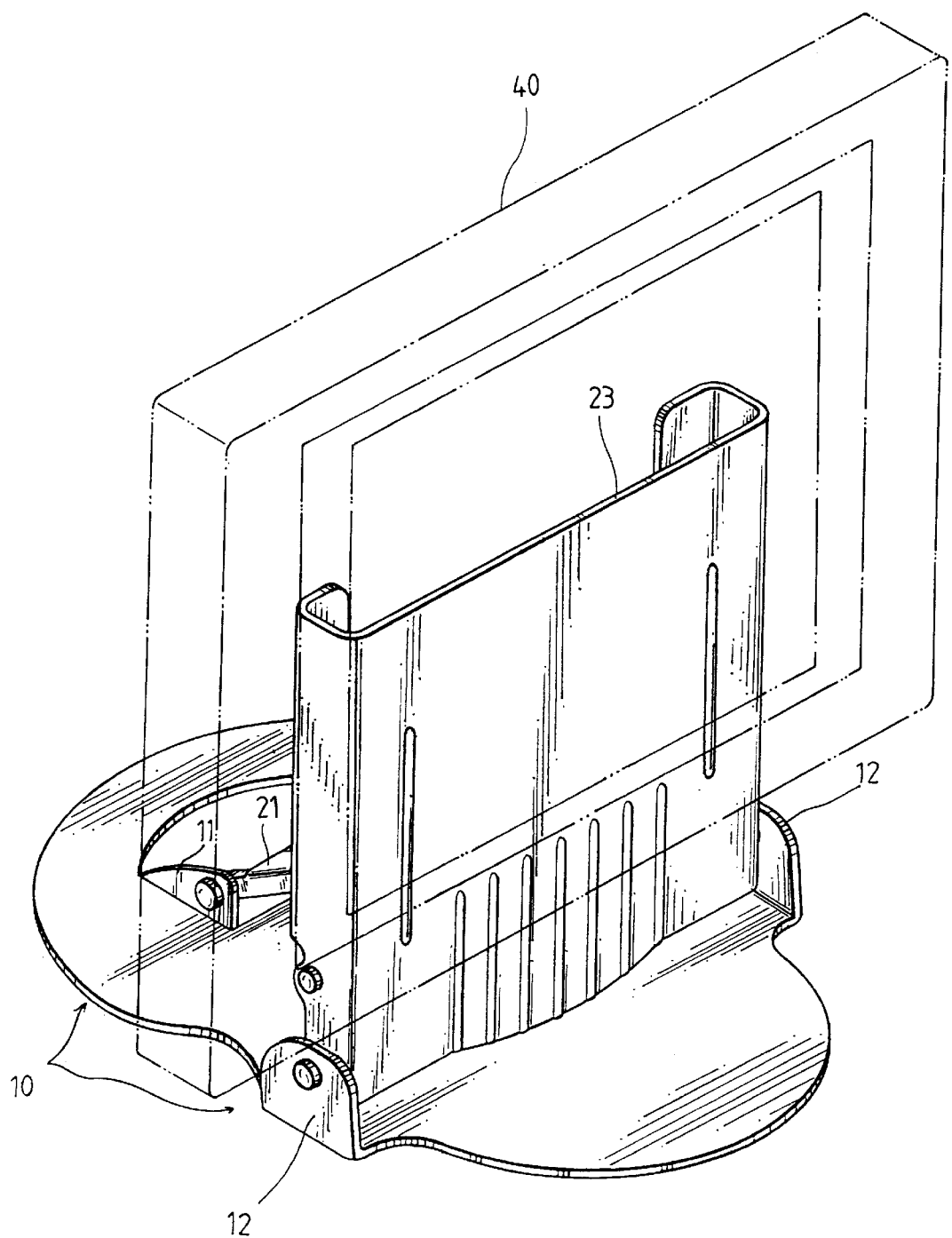
FIG. 2 is a perspective view of the present invention, showing that the support is adjusted to an upright state.
Figure 3:
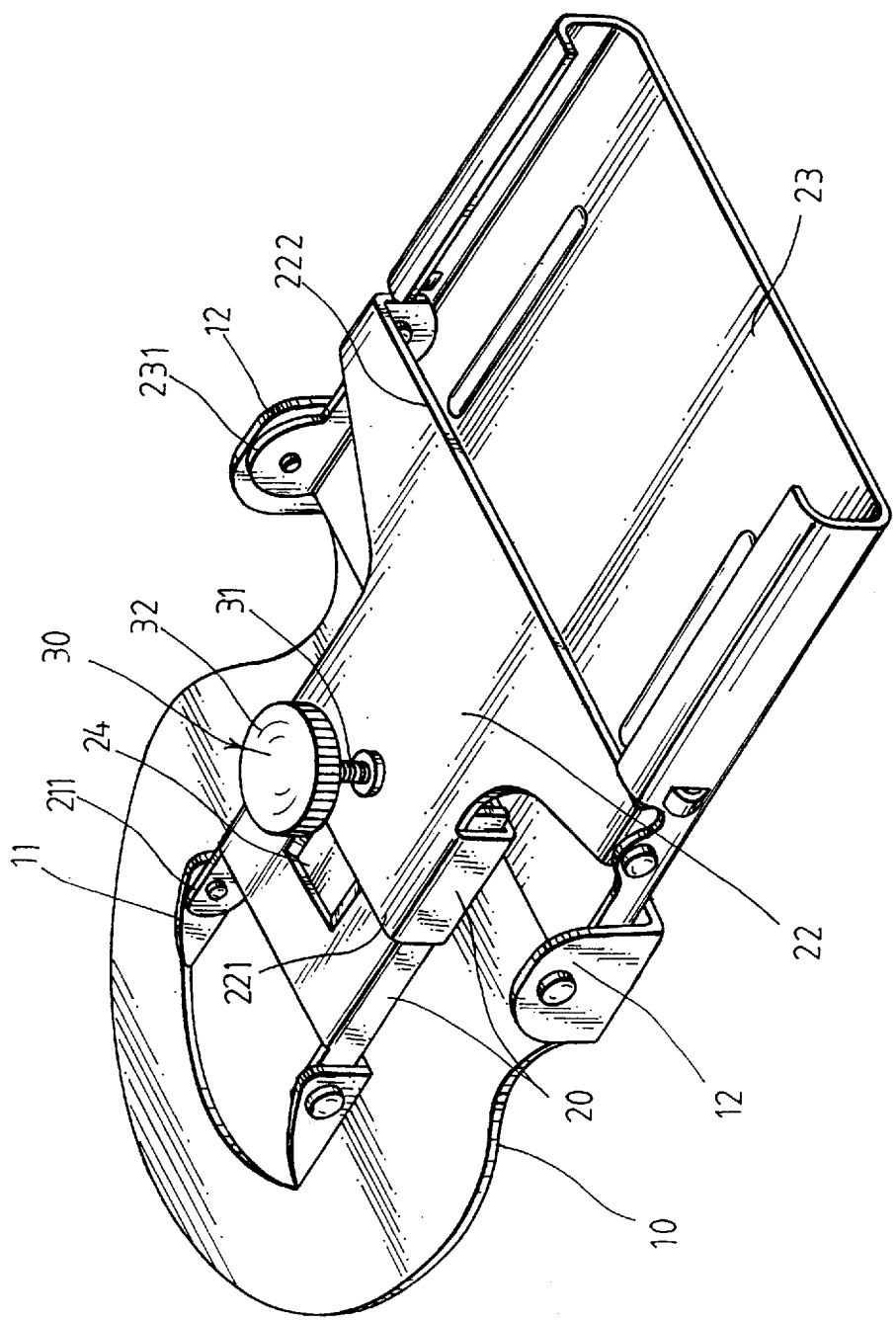
FIG. 3 is a perspective view of the present invention, showing that the support is adjusted to a parallel state.

Referring to FIGS. 2 and 3, when the support 20 and the display 40 are positioned at a normal observation angle, the position of the fixing/adjusting device 30 is positioned within the window 24. In accordance with the adjustment of the angle of the support, the fixing/adjusting device 30 is operated and fixed at different position within the window 24, whereby the first, second and third units 21, 22, 23 are fixed by a certain inclination angle, permitting the display 40 to have different observation angles for a user to choose. The fixing/adjusting device 30 can be a rotary button 32 cooperating with a thread rod 31 to abut against the window 24 to achieve more stable locating effect. When the fixing/adjusting device 30 is fully released, the thread rod 31 is totally separated from the window 24, so that the second unit 22 can be fully moved forward on the first unit 21 until the first, second and third units 21, 22, 23 are shifted to a position parallel to the base seat 10 (as shown in FIG. 3). Accordingly, the volume of the base structure is greatly reduced to facilitate transferring.

According to the above arrangement, the first and third units 21, 23 are freely pivotably connected on the base seat 10 and the second unit 22 is relatively movable on the first unit 21. In addition, the fixing/adjusting device 30 is operated in cooperation with the window 24 to control the inclination angle of the display 40.

It should be noted that the above description and accompanying drawings are only used to illustrate one embodiment of the present invention, not intended to limit the scope thereof. Any modification of the embodiment should fall within the scope of the present invention.

What is claimed is:

1. A base structure for liquid crystal display, comprising a base seat and a support pivotally disposed on the base seat, the display being inserted on the support, said base structure being characterized in that:

the base seat is disposed with at least two connecting sections;

the support includes a first unit, a second unit and a third unit, the first and third units being respectively disposed with end sections for pivotally connecting with the connecting sections of the base seat, the first unit being formed with a window, two ends of the second unit being respectively pivotally connected with the first and third units and the second unit being relatively slidable on the first unit; and a fixing/adjusting device is mounted on the second unit and movable along with the second unit to the window of the first unit to be restricted within the window, whereby the inclination angle of the display is adjusted and fixed within the range of the window.

2. A base structure as claimed in claim 1, wherein the base seat is a disc member.

3. A base structure as claimed in claim 1, wherein the fixing/adjusting device includes a rotary button and a thread rod passing through the second unit and abutting against the window of the first unit.

4. A base structure as claimed in claim 1, wherein one end section of the second unit is formed with a U-shaped channel for slidably fitting with the first unit.

* * * * *